March 3, 1953   J. F. JOY   2,630,186
THREE-WHEELED MOTOR VEHICLES
Filed Dec. 20, 1948

Inventor:
Joseph F. Joy.
by John F. Schmidt
attorney.

Patented Mar. 3, 1953

2,630,186

UNITED STATES PATENT OFFICE 2,630,186

THREE-WHEELED MOTOR VEHICLE

Joseph F. Joy, Pittsburgh, Pa., assignor to Joy Manufacturing Company, Pittsburgh, Pa., a corporation of Pennsylvania Application December 20, 1948, Serial No. 66,246

2 Claims. (Cl. 180—26)

This invention relates to a self-propelled wheeled vehicle, especially to a small, inexpensive vehicle adapted to carry one or two persons for short distances.

There are situations in which it is desirable to use a small vehicle capable of carrying one or two persons at relatively low speeds for short distances. The vehicles available today are not suited to such applications, being far too large and expensive for the purpose. One application of the invention which may be cited as an example is that of a suitable vehicle for mine officials to get from place to place in or near a mine. Another example is a vehicle to be used to teach beginners the principles of driving. As still another example, an embodiment of the invention may be used for a toy for children in the age range of ten to sixteen years.

It is an object of this invention to provide a small vehicle for one or two persons, capable of low or moderate speeds, which may be easily and inexpensively manufactured. This and other objects are accomplished in a vehicle having a very compact drive for its traction wheel. More specifically, the drive passes through the steering column.

Figure 1:
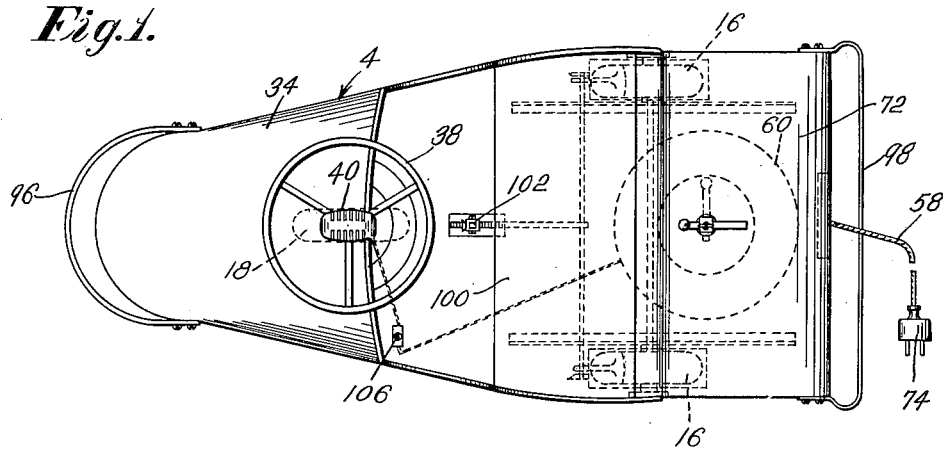
Fig. 1 is a top plan view showing one embodiment of the invention.

The illustrated embodiment shows a vehicle having a floor 2 on which is mounted a body indicated generally at 4. The floor 2 is provided with an opening 6, over which there is disposed a housing 8. The housing may take any convenient form, and is illustrated in the form of a truncated cone substantially circular in cross section, the conical portion of which is provided with a flange 10 which is secured by any suitable means to the floor 2. The lower end of the cone is open, and this opening coincides with the opening 6. The upper end of the cone is closed, preferably by an integral cover member 12, and is provided in addition with a reinforcing member or plate 14.

Suitable load carrying wheels 16 are mounted in any satisfactory conventional manner in the rear part of the vehicle. A third load carrying wheel 18 is supported in the housing 8 and in the opening 6 for rotation about a horizontal axis. The axis of rotation of wheel 18 is provided by an axle 20, the ends of which are carried in a yoke 22. The upper end of yoke 22 is secured to a support plate 24. A steering column 26 is secured to the support plate 24 by any suitable means, as, for example, by welding as shown at 28. A sleeve 30 is secured to the outside of steering column 26 in order to provide a bearing member to take the vertical thrust or load carried by wheel 18. The sleeve 30 bears at its upper end against a bearing plate 32 which is secured to the under side of the aforesaid reinforcing member 14 by screws 33.

A hood 34 which forms a portion of the body 4 is provided at the forward end of the vehicle. The steering column 26 passes through an opening in the hood 34, and a collar 36 is fitted in the opening in the hood and is adapted to receive the steering column. Manually operable means, such as the steering wheel 38, is associated with the steering column in such a manner as to enable an operator to steer the dirigible wheel 18. In the embodiment shown, the wheel 38 may be directly fastened to the steering column 26.

Thus it can be seen that wheel 18 is supported for rotation about a horizontal axis provided by the axle 20, and that support means in turn is mounted for rotation about a vertical axis provided by the steering column 26. An electric motor 40 is supported by the steering column, to that end being mounted preferably directly on the steering wheel 38. In order that the housing of the motor 40 may be non-rotatable in relation to the wheel 38 and the steering column, the housing of the motor 40 is preferably rigidly mounted with respect to one of the spokes of the steering wheel by means of any suitable bracket, such as the one shown at 42. The motor armature drives a drive shaft 44 which extends through the mounting means, mainly the steering column 26 and its associated elements, and is in fact coaxial with the steering column.

Figure 3:
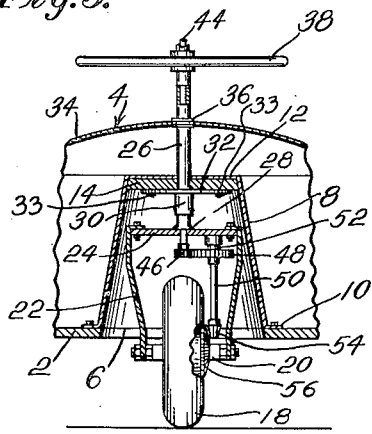
Fig. 3 is a view in section on line 3—3 of Fig. 2.

At its lower end the drive shaft 44 is provided with means to drivingly connect it to the wheel 18. As is best shown in Fig. 3, a gear 46 is secured to the lower end of drive shaft 44. Meshing with gear 46 is another gear 48 which is securely mounted on a shaft 50. The shaft 50 is supported in a bearing 52 which in turn is suitably mounted on the under side of plate 24. Another bearing may, if desired, be provided near the lower end of shaft 50. At the lower end of shaft 50 there is provided a bevel gear 54 which meshes with another bevel gear 56. Gear 56 is secured to wheel 18 in order to drive the wheel.

Figure 4:
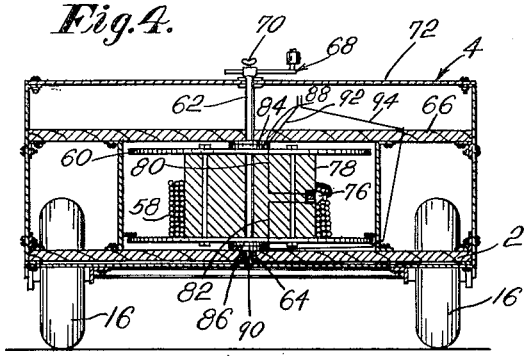
Fig. 4 is a view in section on line 4—4 of Fig. 2.

As is best seen in Fig. 4, electric power is supplied to the motor 40 through a cable 58 which may be of any desired convenient length. In order to prevent damage to the cable, excess cable length may be wound upon a reel 60. The reel 60 is rotatable, here shown on a vertical axis provided by an axle 62. The lower end of axle 62 is rotatably mounted in a bearing 64 provided in the floor 2 of the vehicle. Near its upper end the axle 62 is further supported in a vertical position by a transverse support member or brace 66. At its upper end the axle 62 is preferably provided with adjustable handle means 68. A wing-nut clamp 70 is provided at the upper end of the axle 62 in order to make the handle means 68 adjustable so that it may be moved out of the operator's way when it is not in use. A rear hood 72 over the back part of the vehicle forms a portion of the body 4 and gives the vehicle a smooth exterior contour and provides a finished appearance therefor.

At its outermost end cable 58 is preferably provided with a plug 74 in order that it may be plugged into any suitable electric power outlet. At its innermost end the cable may again be provided with a plug 76, or any other suitable electrical connecting means, to make electric power connections with wires in the hub 78 of the spool or reel 60. The wires are shown schematically as simple lines at 80 and 82 in Fig. 4. Wire 80 is shown as having electrical connection with a contact collar 84. Wire 82 is electrically connected to a contact collar 86. Collars 84 and 86 are secured to the sides of reel 60 and rotate with it. A contact collar 88 is secured to the under side of transverse member 66 and has rubbing electrical contact with the contact collar 84. A contact collar 90 is mounted non-rotatably in relation to floor 2, and has rubbing electrical contact with contact collar 86. Any suitable means, not shown, may be provided to insure that the rubbing contact between collars 84 and 88, and collars 86 and 90, will be maintained in order to provide adequate conductivity for the power to be transmitted. Wires 92 and 94 are shown schematically in Fig. 4, and are connected respectively to contact collars 88 and 90 and lead to the electric motor 40 by any suitable conventional cable means.

Figure 2:
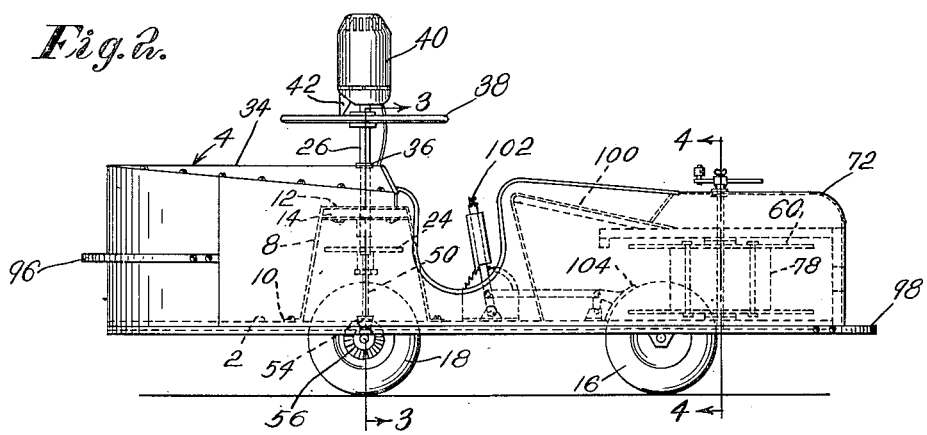
Fig. 2 is a side elevation of the embodiment illustrated in Fig. 1.

The vehicle is preferably provided with suitable bumper means, such as the front bumper 96 and rear bumper 98 shown in the drawings. Any convenient form of support 100 may be provided for the seating of the operator. A brake lever, indicated generally at 102, is connected to operate brake mechanism shown in dotted lines at 104 in Figure 2. In order that the operator may conveniently control the movement of the vehicle by controlling the power, a suitable driving button 106 is preferably provided in the circuit of wires 92 and 94, or, if desired, in just one of the wires. The button 106 will be such as to provide bridging contact in a break in either or both of wires 92 or 94, and is preferably spring biased into open circuit position in order that the operator may be required to exert a conscious effort to hold the button in circuit closing position.

*Operation*

The vehicle operator first plugs the cable 58 into a suitable source of power. He then takes his position in the vehicle, releases the brake, and depressed the operating button 106. This closes the power circuit to the motor 40, and the vehicle moves according to the direction in which the wheel 18 happens to be turned. The drive from the motor to the traction wheel is by way of drive shaft 44 rotating inside the steering column 26 to gear 46, gear 48, shaft 50, gears 54 and 56, and wheel 18. In order to stop the vehicle, the operator merely releases foot pressure to allow the spring biased operating button 106 to return to open circuit position, and if necessary, applies the brake. The vehicle is steered by manipulation of wheel 38, and is reversed simply by turning wheel 38 through 180°, thus obviating the necessity for expensive reverse gearing.

In operating the vehicle to increase the distance between the vehicle and the power source into which the cable is plugged, it is necessary for the operator to allow the vehicle to "pay out" some of the power cable. This is accomplished simply by allowing the reel 60 to unwind. When the operator desires to shorten the distance between the vehicle and the power source, he turns the handle 68 in a direction to wind the cable up on the reel 60.

It may be pointed out here that a large proportion of the total load is carried by the forward wheel in order to provide good traction. If necessary, weight may be added to the forward end to bring the center of gravity just back of the front wheel, which should carry from two-thirds to three-fourths of the total load.

The trend in modern mining methods is toward trackless mines, and vehicles made according to this invention are well adapted to trackless mining operations.

While there is in this application specifically described one form which the invention may assume in practice, it will be understood that this form of the invention may be modified and embodied in various other forms without departing from the spirit of the invention, or the scope of the appended claims.

What I claim as new and desire to secure by Letters Patent is:

1. In a wheeled vehicle, a floor and a bearing support fixed with respect thereto, a ground-engaging wheel, axle means to mount the wheel for rotation about a horizontal axis, a yoke engaging and supporting the axle means, a steering column extending through the bearing support and secured to the yoke, a first bearing fixed relative to the steering column, a cooperating bearing for engagement by and supported on the first bearing, the cooperating bearing being fixed to the bearing support and surrounding the steering column, drive means passing through the steering column and connected to drive the wheel, a steering wheel mounted at the upper end of the steering column and non-rotatable with respect thereto, a motor carried by the steering wheel and positioned above the same, the motor having a housing and being connected to the upper end of the drive means, and means securing the motor housing to the steering wheel to prevent rotation of the motor housing relative to the steering wheel.

2. In a wheeled vehicle, a floor and a bearing support fixed with respect thereto, a ground-engaging wheel, axle means to mount the wheel for rotation about a horizontal axis, a yoke engaging and supporting the axle means, a steering column extending through the bearing support and secured to the yoke, a first bearing fixed relative to the steering column, a cooperating bearing for engagement by and supported on the first bearing, the cooperating bearing being fixed to the bearing support and surrounding the steering column, a drive shaft passing through the steering column, means connecting the drive shaft with the wheel, a steering wheel having a plurality of spokes and being secured to the steering column, an electric motor positioned above the steering wheel, said motor having a housing and being connected to the upper end of the drive shaft, and means securing the motor housing to one of the spokes to prevent rotation of the housing relative to the steering wheel.

JOSEPH F. JOY.

REFERENCES CITED

The following references are of record in the file of this patent:

UNITED STATES PATENTS

| Number | Name | Date |
| --- | --- | --- |
| 949,828 | Lassen | Feb. 22, 1910 |
| 1,105,686 | Olds | Aug. 4, 1914 |
| 1,772,220 | Markey | Aug. 5, 1930 |
| 1,833,844 | Lusse | Nov. 24, 1931 |

FOREIGN PATENTS

| Number | Country | Date |
| --- | --- | --- |
| 446,691 | Great Britain | May 5, 1936 |